(12) United States Patent
Vonken et al.

(10) Patent No.: US 6,288,147 B1
(45) Date of Patent: *Sep. 11, 2001

(54) AQUEOUS DISPERSION ADHESIVE

(75) Inventors: Hub A. G. Vonken, Weert; Jack J. Bogers, Buddel-Schoot, both of (NL)

(73) Assignee: Depron B.V., Weert (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,083

(22) Filed: Sep. 15, 1997

Related U.S. Application Data

(63) Continuation of application No. 08/582,017, filed on Jan. 2, 1996, now abandoned, which is a continuation of application No. 08/294,910, filed on Aug. 24, 1994, now abandoned.

(30) Foreign Application Priority Data

Aug. 28, 1993 (DE) .................................... 43 29 001
Jan. 29, 1994 (DE) .................................... 44 02 688

(51) Int. Cl.$^7$ ................... C08L 1/26; C08L 1/28
(52) U.S. Cl. ................... 524/44; 524/35; 524/43; 524/405; 524/414; 524/417; 524/251; 524/80; 524/492; 524/493; 524/437
(58) Field of Search ................ 524/405, 80, 35, 524/13, 44, 251, 414, 417, 492, 493, 437; 526/330, 331, 329.2, 328, 328.5

(56) References Cited

U.S. PATENT DOCUMENTS

| | | | |
|---|---|---|---|
| 3,639,326 | * 2/1972 | Kray et al. | 526/331 |
| 3,668,165 | * 6/1972 | Bergmeister et al. | 526/330 |
| 3,692,723 | * 9/1972 | Kasagi et al. | 526/331 |
| 3,779,857 | * 12/1973 | Hadgraft et al. | 524/405 X |
| 3,830,761 | * 8/1974 | Lenney | 526/331 |
| 3,861,425 | * 1/1975 | Clark | 524/405 X |
| 3,928,210 | * 12/1975 | Peterson | 524/405 X |
| 3,945,962 | * 3/1976 | Clark | 524/405 X |
| 3,954,724 | * 5/1976 | Nakashio et al. | 526/330 |
| 4,073,779 | * 2/1978 | Wiest et al. | 526/331 |
| 4,108,811 | * 8/1978 | Eckhoff | 524/405 |
| 4,123,405 | * 10/1978 | Oyamada et al. | 526/331 |
| 4,191,675 | * 3/1980 | Inagaki et al. | 524/405 |
| 4,219,454 | * 8/1980 | Iacoviello et al. | 526/331 |
| 4,287,329 | * 9/1981 | Heimberg | 526/331 |
| 4,339,491 | 7/1982 | Lauterbach et al. | 428/317 |
| 4,544,723 | * 10/1985 | Upson et al. | 526/330 |
| 4,853,451 | * 8/1989 | Clark | 526/331 |
| 4,892,917 | * 1/1990 | Hudge | 526/331 |
| 4,906,679 | * 3/1990 | Tokuno et al. | 524/405 |
| 5,187,210 | * 2/1993 | Fitt et al. | 524/405 X |
| 5,349,009 | * 9/1994 | Furlan | 524/563 |
| 5,360,851 | * 11/1994 | Feder et al. | 524/405 X |

FOREIGN PATENT DOCUMENTS

| | | |
|---|---|---|
| 2 244 775 | 5/1973 | (DE) . |
| 79 31 745 | 11/1979 | (DE) . |
| 39 04 972 | 8/1990 | (DE) . |
| 0 036 156 | 9/1981 | (EP) . |
| 0 109 663 | 5/1984 | (EP) . |
| 0 349 320 | 1/1990 | (EP) . |

OTHER PUBLICATIONS

Richard J. Lewis, Sr.; Hawley's Condensed Chemical Dictionary; 13th Ed. p. 40, 1997.*

* cited by examiner

Primary Examiner—Judy M. Reddick
(74) Attorney, Agent, or Firm—Foley & Lardner

(57) ABSTRACT

A dispersion adhesive includes a co- or terpolymer having vinyl acrylate or vinyl acetate units or a copolymer dispersion of an acrylic acid ester and styrene and a high content of flameproofing agent based on compounds of aluminum and/or boron. Additives such as processing and thickening agents, suspending agents and wetting agents are added to the dispersion adhesives, and the dispersion adhesives furthermore can include preservatives, foam suppressants, dispersing agents, film formation agents and a drying retardant. The dispersion adhesives are particularly suitable for gluing rigid polystyrene foams in the form of films or sheets, but are likewise used for gluing gypsum plasterboards, wood and cork to a suitable substrate, and for gluing tiles and cement sheets. The specific composition of the dispersion adhesive results in a very broad spectrum of use, it being particularly advantageous that the dispersion adhesives remain processable over a relatively long period of at least 12 months, that the flameproofing of composites is increased and that they have a high initial adhesive force.

14 Claims, No Drawings

AQUEOUS DISPERSION ADHESIVE

This application is a continuation of application Ser. No. 08/582,017, filed Jan. 2, 1996, now abandoned which is a continuation of application Ser. No. 08/294,910, filed Aug. 24, 1994, now abandoned.

BACKGROUND OF THE INVENTION

1. Field of the Invention

The invention relates to an aqueous dispersion adhesive which includes a copolymer and/or terpolymer dispersion and a flame-proofing agent based on compounds of boron or aluminum.

2. Description of Related Art

A product having as an adhesion-promoting surface layer with such an adhesive is known from EP-B 0 109 663, which describes a flame-resistant wallpaper lining of rigid polystyrene foam, which has on at least one of its surfaces a coating to improve the adhesion between the wallpaper lining and combustible wallpaper. This coating includes a flame-retardant additive and the adhesive of comprised a copolymer or terpolymer having predominantly vinyl acetate units.

The flame-retardant additive includes a non-combustible inorganic compound based on aluminum and boron. The weight ratio of adhesive to flame-retardant additive is 1:3 to 1:8. The coating has a weight per unit area of 100 to 400 $g/m^2$, in particular of 200 to 300 $g/m^2$ in the dry state. The flame-retardant additive is a mixture of aluminum hydroxide and zinc borate in a weight ratio of 1:1 to 7:1, in particular 2:1 to 5:1. The adhesive can also be a terpolymer having predominantly vinyl acetate units as well as ethylene units and vinyl chloride units.

Wall lining sheets or films of rigid polystyrene foam are generally known and are used as so-called wallpaper linings for lining walls before wallpaper is glued on. They are described, for example, in EP-A-0 036 156 and DE-U 79 31 745. In addition to sheets in folded or unfolded form, rolls of film are also employed. With such sheets or films, for example, masonry cracks can be covered, a certain thermal insulation can be achieved and formation of condensation can be prevented.

It is also known from EP-A-0 036 156 to use an adhesive which includes a gluing component which is known per se and additionally 20 to 80% by weight, based on its gluing content, of a flame-retardant agent for gluing wallpaper to foamed polystyrene coverings. Suitable flame-retardant agents are compounds based on ammonium phosphate and ammonium sulfamate.

The teaching of DE-U 79 31 745 is to provide not the adhesive but the adhesion-promoting surface layer applied to the wallpaper lining of rigid polystyrene foam with a flameproofing agent. The pasted wallpaper, with an adhesive already applied to the wallpaper, is then bonded to the wallpaper lining via this adhesion-promoting layer. According to this publication, the wallpaper sheets are coated with an aqueous dispersion of the filled dispersion adhesive type during production and are then dried in a heating zone. The adhesion-promoting layer has the task of increasing the adhesiveness between the wallpaper lining and the pasted wallpaper. The adhesion-promoting surface layer of the wallpaper lining can likewise comprise a flame-retardant additive, but there is no disclosure on the nature and amount of this flameproofing agent or on the application process.

It is also known from DE-A 22 44 775 to employ adhesive compositions based on a vinyl acetate/ethylene copolymer emulsion for reinforcing carpets which comprise a filling material suitable for reducing flammability, such as aluminum oxide trihydrate.

A disadvantage of the coating adhesive known from EP-B 0 109 663 is that it can be employed only as an adhesion-promoting surface layer for rigid polystyrene foam for internal applications, and that it can no longer be processed after storage for a few weeks.

SUMMARY OF THE INVENTION

One object of the present invention is to develop a dispersion adhesive which remains processable for months and which consistently has good adhesion properties for a large number of various materials with respect to the particular substrate with which these materials are glued. Another object is to provide an adhesive having a low flammability. Yet another object is to provide a composite of a substrate and material glued on the substrate having a low flammability. Still another object of the present invention is to provide a substrate that has the aqueous dispersion adhesive applied to at least one surface of the substrate.

In accomplishing the foregoing objects, there has been provided according to one aspect of the present invention an aqueous dispersion adhesive, which includes: (i) an adhesive polymer dispersion selected from the group consisting of a copolymer, a terpolymer and a mixture thereof; (ii) up to about 75% by weight of a flameproofing agent selected from the group consisting of a boron compound, an aluminum compound, a boron and aluminum compound and a mixture thereof; (iii) up to about 0.8% by weight of a processing and thickening agent; and (iv) up to about 0.8% by weight of a wetting agent, in each case based on the total weight of the aqueous dispersion adhesive.

Another aspect of the present invention provides a substrate that has at least one surface coated with the aqueous dispersion adhesive. Further objects, features and advantages of the present invention will become apparent from the detailed description of the preferred embodiments which follows.

DETAILED DESCRIPTION OF THE PREFERRED EMBODIMENTS

The present invention comprises a dispersion adhesive of the type described above, preferably having as additives up to about 0.8% by weight of a processing and thickening agent, up to about 75% by weight of flameproofing agent and up to about 0.8% by weight of a wetting agent, in each case based on the total weight of the dispersion adhesive.

The dispersion adhesive can be used, inter alia, as a rigid foam adhesive for foamed polystyrene films, sheets and shaped articles. The polystyrene is in the form of, for example, web-like films or rectangular sheets. Such sheets comprise extruded rigid polystyrene foam or particle foam, and the processes for the production of such sheets or films and of the materials themselves are known from the literature references cited in EP-A 0 036 156, which is hereby incorporated by reference in its entirety.

Compared with the adhesion promoter known from EP-B 0 109 663, the dispersion adhesive according to the present invention preferably has a higher wetting agent content, preferably includes a suspending agent and preferably has a considerably increased content of processing and thickening agent.

By the positive interaction of these three components, the initial adhesive force and the processability of the dispersion adhesive is increased considerably and is guaranteed over relatively long periods of time of at least 12 months.

In a further development of the invention, the polymer dispersion can include a co- or terpolymer having vinyl acrylate units, and the additive amount of processing and thickening agent can preferably be up to about 0.8% by weight, and the additive amount of a wetting and dispersing agent can be up to about 0.3% by weight. The dispersion is preferably a copolymer of an acrylic acid ester and styrene. However, any suitable copolymer can be used.

In one embodiment of the invention, 100% by weight of aqueous dispersion of the adhesive can include about 15 to 50% by weight, in particular about 20 to 30% by weight, of the co- or terpolymeric dispersion, about 40 to 75% by weight of flame-proofing agent and about 5 to 20% by weight of additions of thickener, wetting agent, suspending agent, preservative, foam suppressant, drying retardant, agent for reducing the film formation temperature and water. However, any suitable range can be used.

The weight ratio of aqueous co- or terpolymeric dispersions to flameproof ing agents preferably ranges from about 1:5 to less than 1:0.8, in particular from about 1:2.9 to 1:2. The coating of adhesive preferably has a weight per unit area of about 300 to 800 g/m$^2$ (moist, i.e., wet basis). However, any suitable weight ratio and coating weight per unit area can be used.

In another embodiment of the invention, 100% by weight of aqueous dispersion of the adhesive can include about 10 to 50% by weight, in particular about 20% by weight, of the copolymer dispersion, about 30 to 62% by weight of flame-proofing agent and about 15 to 21% by weight of additions of thickener, wetting agent, suspending agent, dispersing agent, preservative, foam suppressant and water. However, any suitable range can be used.

The weight ratio of aqueous copolymer dispersion to flameproofing agent preferably ranges here from about 0.16:1 to 1.67:1, and the coating of adhesive is produced with a weight per unit area of 300 to 800 g/m$^2$ (moist, i.e. wet basis). However, any suitable weight ratio and coating weight per unit area can be used.

For determination of the weight ratios, the contents in percent by weight of the co- or terpolymeric dispersion or of the aqueous copolymer dispersion and of the flame-proofing agent are related to one another, preferably with the limits in the weight ranges stated.

The thickening and processing agent is preferably methyl- or hydroxyethylcellulose.

The dispersion adhesive can include a co- or terpolymer having vinyl acrylate units, and in particular a vinyl acrylate/ethylene/vinyl chloride terpolymer is used (for example Vinnapas LT 500, manufacturer: Wacker-Chemie, Germany), which is employed as an aqueous 50% strength by weight dispersion. The terpolymer of the dispersion adhesive can also be a terpolymer of vinyl acetate, ethylene and vinyl chloride units, such as Mowilith® DM 120 or Mowilith® DM 122 (manufacturer: Hoechst AG). The flameproof ing agent includes non-combustible inorganic compounds preferably based on aluminum or boron and aluminum, such as are known from the prior art. These compounds include, inter alia, boric acid or salts thereof and aluminum hydroxide. Preferably, aluminum hydroxide is employed by itself as the flameproofing agent in an amount of about 60% by weight, based on the total weight of the dispersion adhesive. However, the flame-proofing agent can also include a mixture of aluminum hydroxide and zinc borate in a preferred weight ratio of about 3:1 to 8:1.

As already mentioned in EP-B 0 109 663, these flameproofing agents show a considerably lower evolution of smoke gases compared with other flameproofing agents, and have the effect of a considerably reduced flammability of the composite of polystyrene foam and substrate. Furthermore, the adhesion-promoting action of the adhesive raw material is also surprisingly improved, which was not foreseeable. The dispersion adhesive of the present invention achieves the classification B1 (flame-resistant) according to DIN 4102 in several burning tests.

Using the dispersion adhesive of the present invention, which to a certain extent is a universal adhesive, it is possible to glue not only foamed plastics to a corresponding substrate, but also glass fiber wallpapers and fabric/textile/cellulose wallpapers, polyester wallpapers, gypsum fiber sheets, chipboard, tiles, cement sheets, gypsum plasterboard, wood or cork. It is only preferred that one of the surfaces to be glued is porous or absorbent to liquids, in particular water. The above materials are examples only and should not be construed as limiting the applications of the present invention.

Because of its high viscosity, the dispersion adhesive is in general applied with a toothed spatula or with a doctor blade. Under certain circumstances, other application processes, such as, roller application or pouring processes with and without pressure, can also be used. The amount of coating applied is adjusted such that the weight per unit area is generally 300 to 800 g/m$^2$ in the moist state. In addition to the above applicators, any known suitable applicator can be used.

On application, the individual constituents are present in aqueous dispersion, to which small amounts of processing and/or thickening agents, such as methyl- and hydroxyethylcellulose, and in addition dispersion-stabilizing and film-forming auxiliaries may also be preferably added. Thus, wetting agents, such as sodium polyphosphate, suspending agents, such as ammonium polyacrylate, preservatives, foam suppressants, a wetting and dispersing agent, such as an ammonium salt of a polyacrylic acid, and an agent which reduces the film formation temperature, such as diethylene glycol monobutyl ether-acetate, and a drying retardant, such as 2-(2-butoxyethoxy)ethanol, are also optionally added, preferably in a total amount of up to about 3.0 to 4.0% by weight, based on the total weight of the dispersion.

In a preferred embodiment, the aqueous dispersion adhesive contains about 15–50%, preferably about 20–30 %, by weight of the aqueous polymer dispersion, about 40–75% by weight of the flameproofing agent, up to about 0.2 % by weight of the preservative, up to about 0.8% by weight of the foam suppressant, up to about 1.0% by weight of the agent for reducing film formation, up to about 0.5% by weight of the drying retardant, up to about 0.8% by weight of the processing and thickening agent, up to about 0.8% by weight of the wetting agent and about 5–20%, preferably 16.7%, by weight of water. All the above weight percentages are based on the total weight of the aqueous dispersion adhesive.

In another preferred embodiment, the aqueous dispersion adhesive contains about 21.4% by weight of the polymer dispersion, about 58% by weight of the flameproofing agent, about 0.2% by weight of the preservative, about 0.8% by weight of the foam suppressant, about 1.0% by weight of the agent for reducing film formation, about 0.5% by weight of the drying retardant, about 0.7% by weight of the processing and thickening agent, about 0.7% by weight of the suspending agent, up to about 0.8% by weight of the wetting agent, and the remainder as water. All the above percentages are based on the total weight of the agueous dispersion adhesive.

In still another preferred embodiment, the agueous dispersion adhesive contains about 10–50%, preferably about 20%, by weight of the polymer dispersion, about 30–62% by weight of the flameproofing agent, up to about 0.2% by weight of the preservative, up to about 0.9% by weight of the foam suppressant, up to about 0.8% by weight of the processing and thickening agent, up to about 0.8% by weight of the wetting and dispersing agent, and up to about 20%, more preferably about 5–20%, even more preferably 16%, by weight of water. All the above weight percentages are based on the total weight of the aqueous dispersion adhesive.

Two other examples of preferred compositions of the aqueous dispersion adhesive according to the invention are the following:

EXAMPLE 1

| | |
|---|---|
| about 20–40 | parts by weight of a 50% strength aqueous adhesive raw material dispersion of vinyl acrylate/ethylene/vinyl chloride or vinyl acetate/ethylene/vinyl chloride terpolymer, |
| about 0.6–0.8 | parts by weight of a thickening and processing agent, such as hydroxyethylcellulose, |
| about 0.6–0.8 | parts by weight of wetting agent comprising a 33 percent strength by weight aqueous sodium polyphosphate solution, |
| about 0.2–0.3 | parts by weight of suspending agent, such as a 30 percent strength by weight aqueous ammonium polyacrylate solution, |
| about 0.1–0.2 | parts by weight of preservative, such as alkylammonium, isothiazolene or formol derivatives, |
| about 0.7–0.8 | parts by weight of foam suppressant, such as hydrophobic silicic acid, |
| about 0.9–1.0 | parts by weight of an agent for reducing the film formation temperature, such as diethylene glycol monobutyl ether-acetate (butyldiglycol acetate), |
| about 60–66.4 | parts by weight of flameproofing agent, such as aluminum hydroxide, |
| about 0.5 | parts by weight of drying retardant, such as 2-(2-butoxyethoxy)ethanol (butyldiglycol), |
| about 10–20 | parts by weight of water for incorporation of the solids and to establish the viscosity in order to keep the dispersion adhesive brushable. |

EXAMPLE 2
(Halogen-free Formulation)

| | |
|---|---|
| about 10–50 | parts by weight of a 50% strength aqueous adhesive raw material dispersion comprising an acrylic acid ester and styrene, |
| about 0.30–0.65 | parts by weight of a thickener and processing agent, such as methylhydroxyethylcellulose, |
| about 0.3–0.7 | parts by weight of wetting agent comprising a 33 percent strength by weight aqueous sodium polyphosphate solution, |
| about 0.1–0.3 | parts by weight of suspending agent comprising a 30 percent strength by weight aqueous ammonium polyacrylate solution, |
| about 0.1–0.36 | parts by weight of wetting and dispersing agent, such as a 30% strength aqueous solution of an ammonium salt of a polyacrylic acid, |
| about 0.1–0.2 | parts by weight of preservative, such as alkylammonium, isothiazine or formol derivatives, |
| about 0.8–0.9 | parts by weight of foam suppressant, such as hydrophobic silicic acid, |
| about 55–65 | parts by weight of flameproofing agent, such as aluminum hydroxide, |
| about 15–21 | parts by weight of water for incorporation of the solids and to establish the viscosity in order to keep the dispersion adhesive brushable. |

Dispersion adhesives according to the present invention of the above compositions have excellent processing properties, a high initial adhesive force, adequate storage times and very good flame-retardant properties as composites with various building materials which increase the flameproofing of the composites.

EXAMPLE 3

Dispersion adhesives according to the present invention of Examples 1 and 2 show neither gelling, a change in viscosity nor mold formation during normal storage of more than 12 months, and can be processed without problems.

The same applies to a halogen-free dispersion adhesive according to the following table:

TABLE

Halogen-free dispersion adhesive

| Chemical name | Purpose for adding | Weight content in % |
|---|---|---|
| a 50 % strenght aqueous copolymer dispersion comprising an acrylic acid ester and styrene | Adhesive | 20.4 |
| Aluminum hydroxide | Flameproofing agent | 61.2 |
| Methyl- and/or hydroxyethyl-cellulose | Thickener | 0.57 |
| Sodium polyphosphate (33% strength in water) | Wetting agent | 0.33 |
| Ammonium polyacrylate (30% strength in water) | Suspending agent | 0.11 |
| Ammonium salt of a polyacrylic acid (30% strength in water) | Wetting and dispersing agent | 0.32 |
| Alkylammonium or isothiazine derivatives | Preservative | 0.19 |
| Hydrophobic silicic acid | Foam suppressant | 0.82 |
| Water | Diluent | 16.0 |

EXAMPLE 4
(Comparison Example)

The storage life of the adhesion-promoting surface layer of the formulation as described in EP-A 0 109 663 is not more than 4 weeks. Thereafter, this product has gelled completely under normal storage and is no longer processable.

EXAMPLE 5

Good gluing properties with wall and ceiling lining material (building materials) have been found for the dispersion adhesives according to the present invention.

An adhesion-promoting coating dispersion as described in EP-A 0 109 663 is not suitable for this use. The composition is built up such that the coating dispersion cannot be used as an adhesive, but can be used only as a product which is applied mechanically as an adhesion-promoting surface layer for rigid polystyrene foam.

Other embodiments of the present invention will become apparent to these skilled in the art from consideration of the specification and practice of the invention disclosed herein. It is intended that the specification be considered as exemplary only, with the true scope and spirit of the invention being indicated by the following claims.

What is claimed is:

1. An aqueous dispersion adhesive comprising:
   an adhesive polymer dispersion which comprises a terpolymer which has predominantly vinyl acrylate monomer units;
   a flameproofing agent which is present in an amount up to about 75% by weight and is selected from the group consisting of a boron compound, an aluminum compound, a boron and aluminum compound and a mixture thereof;
   a processing and thickening agent which is present in an amount up to about 0.8% by weight;
   a wetting agent which is present in an amount up to about 0.8% by weight; and
   a suspending agent which is present in an amount up to about 0.3% by weight in each case based on the total weight of the aqueous dispersion adhesive.

2. An aqueous dispersion adhesive as claimed in claim 1, comprising 15 to 50% by weight of the adhesive polymer dispersion, 40 to 75% by weight of the flameproofing agent, and at least one additive selected from the group consisting of a preservative, a foam suppressant, a drying retardant, an agent for reducing the film formation temperature, and water wherein the combined amount of the additives, the suspending agent and the processing and thickening agent is from 5 to 20% by weight, in each case based on the total weight of the aqueous dispersion adhesive.

3. An aqueous dispersion adhesive as claimed in claim 1, wherein the polymer dispersion is an aqueous polymer dispersion, and the weight ratio of the aqueous polymer dispersion to the flameproofing agent ranges from about 1:5 to less than 1:0.8, and a coating of the adhesive has a weight per unit area of about 300 to 800 g/m² on a wet basis.

4. An aqueous dispersion adhesive as claimed in claim 2, wherein the thickening and processing agent is at least one of methyl- or hydroxyethylcellulose.

5. An aqueous dispersion adhesive as claimed in claim 1, wherein the polymer dispersion is an aqueous polymer dispersion, and the weight ratio of the aqueous polymer dispersion to the flameproofing agent ranges from about 0.16:1 to 1.67:1, and a coating of the adhesive has a weight per unit area of about 300 to 800 g/m² on a wet basis.

6. An aqueous dispersion adhesive as claimed in claim 1, wherein the suspending agent comprises ammonium polyacrylate in a 30 percent strength by weight aqueous solution.

7. An aqueous dispersion adhesive as claimed in claim 1, wherein the wetting agent comprises sodium polyphosphate in a 33 percent strength by weight aqueous solution.

8. An aqueous dispersion adhesive as claimed in claim 7, comprising up to about 0.2% by weight of the preservative, up to about 0.8% by weight of the foam suppressant, up to about 1.0% by weight of agent for reducing the film formation temperature, up to about 0.5% by weight of the drying retardant and up to about 30% by weight of water, as a diluent, based on the total weight of the aqueous dispersion adhesive.

9. An aqueous dispersion adhesive as claimed in claim 8, wherein the water content is about 10 to 30% by weight.

10. An aqueous dispersion adhesive as claimed in claim 8, comprising about 21.4% by weight of the adhesive polymer dispersion, about 58% by weight of flameproofing agent, about 0.7% by weight of the processing and thickening agent, about 0.7% by weight of the suspending agent, about 0.2% by weight of the preservative, about 0.7% by weight of the wetting agent, about 0.8% by weight of the foam suppressant, about 1.0% by weight of the agent for reducing the film formation temperature, about 0.5% by weight of the drying retardant and water as the remainder.

11. An aqueous dispersion adhesive as claimed in claim 1, comprising up to about 0.2% by weight of a preservative, up to about 0.9% by weight of a foam suppressant, up to about 0.80% by weight of a dispersing agent, up to about 0.6% by weight of the processing and thickening agent and up to about 30% by weight of water, as a diluent, based on the total weight of the aqueous dispersion adhesive.

12. An aqueous dispersion adhesive as claimed in claim 11, wherein the water content is 10 to 30% by weight.

13. An aqueous dispersion adhesive as claimed in claim 2, wherein the preservative comprises at least one of an alkylammonium or isothiazine derivative.

14. An aqueous dispersion adhesive as claimed in claim 2, wherein the foam suppressant comprises hydrophobic silicic acid.

* * * * *